US010643755B2

United States Patent
Slesarev et al.

(10) Patent No.: US 10,643,755 B2
(45) Date of Patent: May 5, 2020

(54) DEVICE FOR PASSIVE PROTECTION OF A NUCLEAR REACTOR

(71) Applicant: STATE ATOMIC ENERGY CORPORATION "ROSATOM" ON BEHALF OF THE RUSSIAN FEDERATION, Moscow (RU)

(72) Inventors: Igor Sergeevich Slesarev, Moscow (RU); Viktor Nikolaevich Leonov, Moscow (RU); Boris Borisovich Kubintsev, Moscow (RU); Elena Aleksandrovna Rodina, Moscow (RU); Yuriy Vasilevich Chernobrovkin, Moscow (RU); Aleksey Borisovich Shevchenko, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 107 days.

(21) Appl. No.: 15/578,950

(22) PCT Filed: Apr. 5, 2016

(86) PCT No.: PCT/RU2016/000189
§ 371 (c)(1),
(2) Date: Dec. 1, 2017

(87) PCT Pub. No.: WO2016/195536
PCT Pub. Date: Dec. 8, 2016

(65) Prior Publication Data
US 2018/0174693 A1    Jun. 21, 2018

(30) Foreign Application Priority Data

Jun. 1, 2015 (RU) .................................. 2015120831

(51) Int. Cl.
*G21C 15/18* (2006.01)
*G21C 7/22* (2006.01)
(Continued)

(52) U.S. Cl.
CPC .............. *G21C 15/18* (2013.01); *G21C 7/22* (2013.01); *G21C 7/24* (2013.01); *G21C 9/033* (2013.01); *G21C 3/326* (2013.01); *Y02E 30/39* (2013.01)

(58) Field of Classification Search
CPC .......... G21C 3/326; G21C 15/18; G21C 7/22; G21C 7/24; G21C 9/033
See application file for complete search history.

(56) References Cited

U.S. PATENT DOCUMENTS 2,987,455 A    6/1961  Huston et al.
3,773,619 A    11/1973 Harrington et al.
(Continued)

FOREIGN PATENT DOCUMENTS

DE    2625543 A1    12/1976
EP    0503552 A1    9/1992
(Continued)

OTHER PUBLICATIONS

International Preliminary Report on Patentability (with English Translation), dated Dec. 5, 2017, issued in corresponding International Application No. PCT/US2016/000189, 9 pages.
(Continued)

*Primary Examiner* — Lily C Garner
(74) *Attorney, Agent, or Firm* — Dentons US LLP

(57) ABSTRACT

The invention relates to nuclear reactor protection systems and can be used when building nuclear reactors, in particular, the fast neutron reactors. The Technical result of the invention consists in the expansion of 5 functional capabilities of the negative reactivity passive insertion device by
(Continued)

securing its reliable actuation in various emergency conditions. The device has two vessels located in a common enclosure one under another with a ring-shape hollow space between the vessels and the enclosure to let the heat carrier flow. Fuel elements are located in the ring-shape hollow space, as well as the tooling for the heat carrier flow formation to cool the fuel elements and heat the upper vessel. The upper vessel is located above the reactor core and is divided with an internal partition wall to the central cylindrical and ring-shape hollow spaces. The partition wall has low thermal conductivity in the transverse direction. In the central hollow space of the upper vessel the cadmium isotope is mainly located, while in its ring-shape space—mercury. Lower vessel is mainly located in the active core of the reactor and filled with inert gas. The vessels are connected with a pipe with a partition, made in the form of buckling rapture disc.

12 Claims, 1 Drawing Sheet

(51) Int. Cl.
    *G21C 9/033*    (2006.01)
    *G21C 7/24*    (2006.01)
    *G21C 3/326*    (2006.01)

(56) References Cited

U.S. PATENT DOCUMENTS

| | | | | |
|---|---|---|---|---|
| 4,104,122 A * | 8/1978 | Malaval | ............... | G21C 9/033 376/328 |
| 4,221,637 A | 9/1980 | Malaval | | |
| 4,432,208 A * | 2/1984 | Onuki | ............... | G21C 19/313 376/210 |
| 4,526,742 A | 7/1985 | Hannerz | | |
| 4,767,593 A * | 8/1988 | Wedellsborg | ............ | G21C 13/04 220/560.03 |
| 2016/0005497 A1 * | 1/2016 | Scott | ............... | G21C 1/03 376/360 |
| 2016/0329113 A1 * | 11/2016 | El-Genk | ............... | G21C 15/12 |

FOREIGN PATENT DOCUMENTS

| | | |
|---|---|---|
| EP | 2270815 A2 | 1/2011 |
| GB | 1421068 A | 1/1976 |
| JP | S4943092 A | 4/1974 |
| JP | S56172798 U | 12/1981 |
| JP | S60140189 A | 7/1985 |
| JP | H02281189 A | 11/1990 |
| JP | 3269397 A | 11/1991 |
| JP | H07209468 A | 8/1995 |
| RU | 2172986 C1 | 8/2001 |
| WO | WO-2013079664 A1 * | 6/2013 ............. G21C 3/326 |

OTHER PUBLICATIONS

Written Opinion of the International Search Authority (with English Translation), dated Sep. 15, 2016, issued in corresponding International Application No. PCT/RU2016/000189, 7 pages.

International Search Report (with English Translation), dated Sep. 15, 2016, issued in International Application No. PCT/RU2016/000189, 3 pages.

Supplementary European Search Report, Date of completion of the search: Dec. 5, 2018, issued in corresponding European Patent Application No. EP 16 80 3834, 2 pages.

* cited by examiner

DEVICE FOR PASSIVE PROTECTION OF A NUCLEAR REACTOR

CROSS-REFERENCE TO RELATED APPLICATIONS

This application is a US 371 Application from PCT/RU2016/000189 filed Apr. 5, 2016, which claims priority to Russia Application 2015120831 filed Jun. 1, 2015, the technical disclosures of which are hereby incorporated herein by reference.

TECHNICAL FIELD

The invention relates to nuclear reactor protection systems and can be used when building nuclear reactors, in particular, the fast neutron reactors 5.

Preceding technical level in the existing reactor facilities (RF) with sodium heat carrier and in the RF projects with heavy heat carrier of the reactor core reactivity control system, as a rule, is based on the use of poison rods, which at rapidly developing emergency situations are mechanically inserted in the reactor core using the Control & Protection System (CPS) drives or are put down into the reactor core under the effect of the gravity force or up under the effect of the Archimedes buoyant force.

Devices that use the passive principle of actuation when reaching limit values of the reactor core parameters, such as maximum permissible temperatures, circulation rate, heat carrier pressure and other are used to improve the reliability of actuation of protection. Such devices are spontaneously actuated in emergency situations based on the use of various physical effects, e.g., melting, change of shape or volume, magnetic properties of materials, of which the structural elements of the devices are made (membranes, bellows, fusible links and bimetallic elements, etc. (see Journal "Nuclear technology abroad," 1988, No. 1, pp. 10-16). However, for the designed new-generation fast neutron reactors the emergency protection based on mechanical rod systems does not secure high reliability of actuation. This is due to stiff conditions of the reactor core operation under the long-term impact of high neutron flows and temperatures leading to the materials swelling and changes of the geometrical shape of the reactor core's structural elements. Apart from this, the rods in heavy heat carriers are subject to the effect of a significant buoyancy force that makes it difficult for the rods to fall down into the RF reactor core. In such conditions the use of the emergency protection control members in the form of absorbing rods reduces the reliability of their emergency insertion into the reactor core for the chain reaction suppression.

There is a passive protection device of fast-neutron reactor located in the enclosure of the fuel assembly [RU20725702].

In accordance with the invention, a bunch of absorbing rods with shaft, shortened fuel elements radiation heaters and actuation mechanism that reacts to the emergency temperature rise within the range from 570 to 650° C. are placed in the fuel assembly of the fast neutron reactor FN-600 with the openings for the heat carrier, casing and bottom nozzle. In one of 5 orifices of the top fitting of the assembly a self-axis rocket arm is installed, one arm of which has a fork grip that holds the bunch of absorbing rods, and the other arm is inserted into the opening of the bi-metal element plate fastened on the top fitting. When the active nuclear reactor protection system fails, the emergency heat carrier temperature rise makes the bi-metal plate bend, the rocket arm with fork grip jumps out of the mesh and casts the absorbing rod bunch in the reactor core to suppress the nuclear reaction. However, the geometry of the absorbing rod bunch, as well as the characteristics of the bi-metal elements and their actuation thresholds significantly change under intense neutron irradiation and high heat carrier temperatures, which reduces the reliability of such passive protection devices.

There is a safety device for a nuclear reactor with closed hermetic bellow filled with a substance with the melting temperature corresponding the device actuation temperature (RU 2086009). One of the bellow ends is fastened rigidly, while the other is connected with the triggering mechanism, and a compressed spring is between the ends of the bellow. If substance melts, in case of the emergency temperature rise of the heat carrier, the device secures the shift of the bellow's free end and actuation of the triggering mechanism secured both by the tension of bellow and spring, and by the growth of the melted substance's volume.

The common drawbacks of the analogues provided above in the conditions of long-term neutron irradiation and high temperature impact are that the geometry of the absorbing rod bunch changes significantly, as well as the functional characteristics of the bi-meal elements, bellows and springs deteriorate and, accordingly, their actuation thresholds change. Apart from this, for the fast neutron reactors with heavy heat carrier (e.g., lead) some design difficulties associated with the absorbing rod bunch falling down realization occur.

A passive safety device of fast neutron nuclear reactor with sodium heat carrier integrated into its fuel assembly is known. The device consists of a fuel assembly enclosure in the upper part of the ring unit located on the internal lateral surface of the enclosure.

The ring unit is made in the form of a punched envelope with a fusible matrix inside, where the particles of the material 5, that absorbs neutrons, are dispersed. When the heat carrier temperature rises higher than the set level, the matrix melts, and the dispersed particles of the neutron-absorbing material go from the punched envelope to the reactor core to suppress nuclear reactions. However, this device cannot be used for the reactors with heavy (e.g., lead) heat carrier, since the relatively light particles of the neutron-absorbing material will emerge in the heavy heat carrier and will be withdrawn from the fuel assembly and reactor core.

There is a passive device for the emergency reduction of the reactor activity—a hermetic outer cylindrical container located in the reactor core, with two rods vertically located, and between these rods a hermetic internal container is placed (GB866305). The internal container is filled with a substance, e.g., mercury that efficiently absorbs neutrons and intensely evaporates at high temperatures. When the temperature in the reactor core rises higher than the allowable level, the swelling rods break the enclosure of the internal container, the absorbing substance evaporates and fills the spare volume of the external container, which results in the abrupt growth of the neutron absorption. However, this design does not meet the conditions of actuation of the emergency passive device with the required accuracy due to the accumulated dimensional changes of the structural elements as the result of the radiation swelling processes. Besides, the device does not secure the insertion of large amounts of absorbing material in the reactor core, which does not allows securing the required parameters of the neutron absorption efficiency in case of emergency situations.

There is a passive safety device for the reactor in the form of two hermetic interconnected vessels located one under another (U.S. Pat. No. 4,104,122), which is the closest to the proposed technical solution. The upper vessel located outside the reactor core is filled with liquid neutron absorber and gas under certain pressure, while the lower one is filled with gas under certain pressure. A pipeline, lower end of which is closed with circumferential welding of uranium cap with brazed alloy, which melts when uranium cap heats in case of emergency situation occurs is inserted into the bottom.

When the uranium cap gets unsealed, the pressure in the lower vessel drops, and the liquid neutron absorber spontaneously flows from the upper vessel to the lower one, i.e. goes to the reactor core to stop the chain reactions. The drawback of this device is that its efficient actuation takes place only at 5 accidents caused by the rapid growth of the neutron flux density. Such device does not secure reliable actuation of the passive protection and reactor shut down to prevent the accident caused by other reasons, e.g., associated with the loss of heat carrier flow rate in the reactor core.

SUMMARY OF THE INVENTION

The objective of the invention is the creation of a reliable device for passive insertion of negative reactivity in case of emergency operation modes, caused both by the rapid growth of the neutron flux and the heat carrier temperature rise at the outflow from the reactor core, e.g., at the loss of the heat carrier flow rate.

The technical result of the invention consists in the extension of the functional capability of the device for the negative reactivity introduction by securing its reliable actuation in the emergency conditions caused both by the neutron flow growth and the heat carrier temperature rise at the outlet from the reactor core, e.g., at the loss of the heat carrier flow rate.

The technical result of the inventions is reached due to the fact that the device for the nuclear reactor passive protection is made in the form of two vessels located in the common enclosure one under another with a ring-shape hollow space to allow the heat carrier flow, the upper vessel is located higher than the reactor core and is partially filled with molten metal with large neutron-absorption cross-section, as well with molten metal with high vapour pressure within the range of the probable heat carrier temperatures; the lower vessel is mainly located in the reactor core and is filled with an inert gas; the vessels are interconnected with a partitioned pipe made in the form of a safety buckling rapture disc, and the fuel assemblies, as well as the means for the heat carrier flow forming to cool down the fuel assemblies and heat the upper vessel are located in the ring-shape hollow space, at that.

In particular design variants the mercury isotope—$^{199}$Hg is used as a molten metal with large neutron-absorption cross-section and a molten metal with high vapour pressure in the range of the possible heat carrier temperatures. Mercury alloys with cadmium isotopes $^{ui}$Cd and/or $^{113}$Cd can be also used as a molten metal with large neutron-absorption cross-section and a molten metal with high vapour pressure in the range of the possible heat carrier temperatures. In accordance with other device designs, mercury can be used as molten metal with high vapour pressure in the range of the probable heat carrier temperatures, and the cadmium isotopes luCd and/or $^{113}$Cd can be used as the molten metal with large neutron absorption cross-section.

In another device design, an internal partition wall is located in the upper vessel to form the interconnected central cylindrical and ring-shape hollow spaces in the upper part, at that the partition wall has low heat conductivity in the transverse direction. In this case, the partition wall can be made with two layers with a gas heat-insulating gap between the layers.

With such design of the upper vessel, in its central hollow space a molten metal with high neutron-absorption cross-section is located, and in the ring-shape upper vessel the molten metal with high vapour pressures in the range of the probable heat carrier temperatures is mainly located. Such design allows us to reduce the time of the device actuation at the emergency heat carrier temperature rise due to the reduction of the molten metal heating time in the ring-shape hollow space, and the increase of the vapour pressure prior to the buckling rapture disc. In this design of the device mercury and cadmium are located in different volumes of the upper vessel, but at that in its upper part they have a common gas vapour cushion. The volume of mercury location in the ring-shape part of the vessel is significantly fewer than that of cadmium in the central part of the vessel. The outside surface of the upper vessel is in the direct contact with the hot heat carrier flow going from the ring-shape hollow space with fuel elements. The ring-shape vessel with mercury is separated from the central volume with cadmium by means of a wall with a gas heat-insulating gap which significantly reduces the response time of the device. This is reached due to the fact that the mercury heating up to the extreme temperature and the corresponding growth of its vapour pressure required to break its membrane in such design are reached without heating the whole bulk of the metal absorber.

The tooling of the heat carrier flow formation for the fuel assembly cooling can be made as a lower pipe shell located between the lower vessel and the fuel elements, and with a transverse partition wall of the ring-shape hollow space in the upper part. In the cross-section the shape of the pipe shell for forming the heat carrier flow for the fuel element cooling mainly matches the shape of the device enclosure, and made, e.g., as a hexagon. Such design of this structural element forms a narrow ring-shape heat carrier flow that cools the fuel elements located in the device, which allows forming the fuel element cooling mode and change the heat carrier temperature in the device in accordance with the fuel element cooling mode, and the heat carrier temperature change in the regular fuel assembly.

The tooling of the heat carrier flow formation for the upper vessel heating can be made as a lower pipe shell located between the upper vessel and the enclosure, and with a transverse partition wall of the ring-shape hollow space in the peripheral part. In the cross-section the shape of the pipe shell for the upper vessel heating mainly matches the shape of the upper vessel. Such design of this structural element forms a narrow ring-shape heat carrier flow for heating the lateral surface of the upper vessel and the molten metal with high vapour pressure at the heat carrier temperatures in the reactor core. At that, the location of the transverse partition walls in the lower and upper pipe shells of the device allow forming the heat carrier work flow in the device and direct the heated heat carrier from the ring-shape hollow space where fuel elements are located, to the lateral surface of the upper vessel with the evaporating melt. This allows forming the heat carrier flow channel in the device where the heat carrier temperature change corresponds the heat carrier temperature change in the regular fuel assembly.

At that, the heat carrier in this channel has direct contact with the surface of the upper vessel, which allows rapid heating of the evaporating melt 5 at the emergency heat carrier temperature rise. Such design of the device allows the reduction of the negative reactivity introduction (decreasing its response time) and increasing the reliability of its actuation at the heat carrier temperature rise in the reactor core higher than the pre-set limit value.

The hollow space between the lower vessel and the lower pipe shell and between the enclosure and the upper pipe shell are interconnected with pipe channels and form the second heat carrier flow channel in the device, that serves for the withdrawal of a part of the heat carrier flow going through the ring-shape hollow space between the lower pipe shell and the lower vessel, in the upper part of the device—to exclude its mixing with hotter heat carrier flow in the first channel.

To simplify the deployment of the nuclear reactor core the shape and the dimensions of the enclosure of the device cross-section mainly correspond to the shape and size of reactor fuel assembly. For example, when the fuel assemblies with hexagonal covers are used, in the enclosure cross-section has a Hexagon shape, and in the case of square-shaped FA the enclosure is made in the form of a square with relevant dimensions.

To improve the fast neutron reactor shut-down efficiency at the device actuation and when the molten metal with large neutron absorption cross-section is fed, e.g., in the form of cadmium isotopes mCd and/or 113 Cd, there are pipe elements located longitudinally between the lower vessel and the lower pipe shell, with the neutron moderator, e.g., beryllium oxide. Such elements are introduced into the device to soften the neutron spectrum in the area of the lower vessel and to increase the efficiency of the negative reactivity introduction in the reactor core when the device gets actuated and the melt with large neutron-absorbing cross-section flows to the lower vessel.

DESCRIPTION OF DRAWINGS

The device is illustrated with drawings in FIG. 2, FIG. 1 and FIG. 3, where some variants of its implementation are provided.

DESCRIPTION OF THE INVENTION REALIZATION VARIANTS

Figure 1:
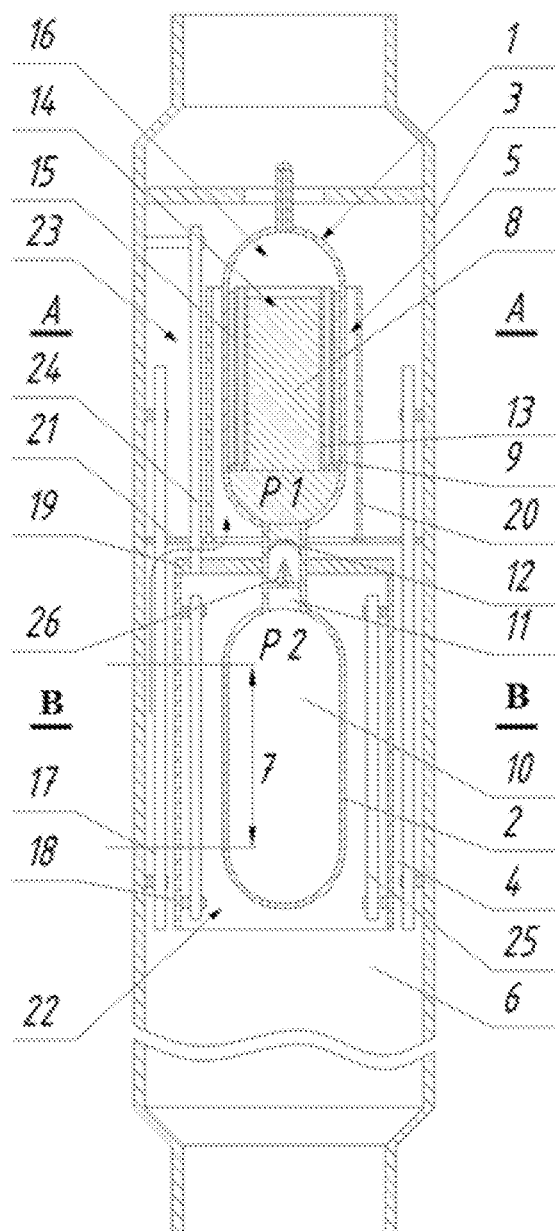
FIG. 1 shows a longitudinal section of the device in the central plane.

The fast neutron reactor protective device is made as an upper vessel (1) and lower vessel (2), located inside a common enclosure one over another.

Ring-shape hollow spaces (4) and (5) are located between the vessels (1) and (2) and the enclosure (3). The upper vessel (1) is located above the reactor core (7) and is partially filled with the molten metal (8), with large neutron absorption cross-section, as well as metal melt (9) with high vapour pressure in the range of the probable heat carrier temperature range. In particular variants of the device design one substance, e.g., the mercury isotope 199 Hg or the mercury alloy with the cadmium isotopes luCd and/or 113 Cd can be used as molten metals (8) and (9). In accordance with the device design shown in FIG. 1, FIG. 2 and FIG. 3 mercury is used as the molten metal (9), and the cadmium isotopes ulCd and/or 113 Cd can be used as molten metals (8).

Lower vessel (2) is mainly located in the reactor core (7) reactor and filled with inert gas (10). The vessels (1) and (2) are connected with a pipe (11) with a partition, made in the form of buckling rapture disc (12).

Figure 2:
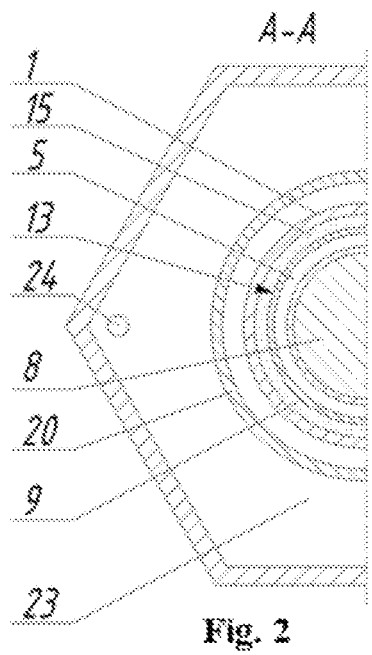
FIG. 2 shows a cross section of the device at the top of the tank.
Figure 3:
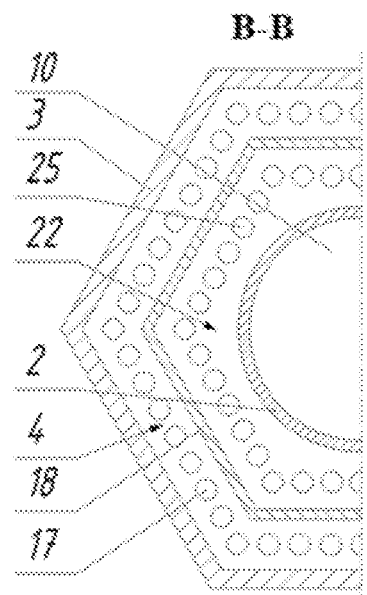
FIG. 3 shows the cross-section of the device at the area of the lower vessel.

In the design, shown in FIG. 1, FIG. 2 and FIG. 3 the molten metal (9)—mercury and the molten metals (8)— cadmium are located in different volumes of the upper vessel (1), and in its upper part they have a common gas vapour cushion (16). The volume of the hollow space(15) for mercury is significantly less than the volume of the hollow space (14) for cadmium. The internal partition (13) is located to form the central cylindrical (14) and the ring-shape (15) hollow spaces are located in the upper vessel (1). The partition wall (13) has low thermal conductivity in transverse direction, e.g., a two-layer wall with gas heat gap (16) between the layers. With such design of the upper vessel (1), in its central hollow space (14) a molten metal with high neutron-absorption cross-section (8) is mainly located, and in the ring-shape upper vessel (15) the molten metal with high vapour pressures in the range of the probable heat carrier temperatures (9) is mainly located. Such device design allows decreasing of the device actuation time at the emergency heat carrier temperature rise. This is reached due to the fact that in such design the mercury heating up to the extreme temperature and the corresponding growth of its vapour pressure required to break its membrane in such design are reached without heating the whole bulk of the metal absorber (8).

In a ring-shape hollow space (5) fuel elements (17) are located, as well as the tool for the flow forming to cool the fuel elements (17), made as a lower pipe shell (18), with a transverse partition wall in its upper part (19), that divides the central part of the ring-shape hollow space (5). In the transverse cross-section the shape of pipe shell (18) mainly matches the shape of the enclosure (3) of the device, e.g, is designed as a hexagon. This design of the pipe shell (18) forms a narrow ring-shape flow of heat carrier (6) to cool the fuel elements (17). This allows forming the fuel element (17) cooling mode and the heat carrier (6) temperature change in the device in accordance with the fuel element cooling mode and the heat carrier temperature change in a regular fuel assembly.

In a ring-shape hollow space (4) there is a tooling for the heat carrier (6) flow formation for the upper vessel heating, made in the form of the upper pipe shell (20), located between the upper vessel (1) and the enclosure (3) and with a transverse partition wall (21) in its lower part, which overlies the peripheral part of the ring-shape hollow space (4).

In the cross-section the shape of the pipe shell (20) mainly matches the shape of the lateral space of the upper vessel (1). Such design of the pipe shell (20) forms a narrow ring-shape heat carrier flow (6) for heating the lateral surface of the upper vessel (1) and metal melt (9). At that, the location of the transverse partition walls (19) and (21) allows forming the heat carrier flow (6) in the device and directing it from the ring-shape hollow space (4), where fuel elements (17), are located to the hollow space (5) right to the lateral surface of the upper vessel (1) to heat the melt (9). Such device design allows forming the heat carrier circulation channel in the device where the its temperature change corresponds to the heat carrier temperature change in the regular fuel assembly, including at emergency situations. Such design of the device allows the reduction of the negative reactivity introduction (decreasing its response time) and increasing the reliability of its actuation at the heat carrier temperature rise in the reactor core higher than the pre-set limit value.

The hollow space (22) between the lower vessel (2) and the lower pipe shell (18), and the hollow space (23) between the enclosure (3) and upper pipe shell (20) are interconnected with each other via pipe channels (24) and form the second channel for liquid flow in the device, that serves to drain parts the flow of the heat carrier flowing through the ring-shape hollow space (22), without letting its mixing with a hotter heat carrier flow from the ring-shape hollow space (4) with fuel elements (17), to the hollow space (5) and washing the lateral surface of the upper vessel (1).

To simplify the deployment of the nuclear reactor core (7) the shape and the dimensions of the enclosure (3) of the device cross-section mainly correspond to the shape and size of reactor fuel assembly. E.g., when the fuel assemblies with hexagonal covers are used, the transverse cross-section of the enclosure is a Hexagon, and in the case of square-shaped FA without covers the enclosure (3) is made in the form of a square with relevant dimensions.

To improve the reactor shut-down efficiency at the device actuation and when the molten metal is fed (8), e.g., in the form of cadmium isotopes $ulCd^{113}$ and/or Cd, in particular, there are pipe elements (25) located longitudinally between the lower vessel (2) and the lower pipe shell (18), with the neutron moderator, e.g., beryllium oxide. Introduction of moderator is intended to mitigate the range of neutrons in a zone of lower vessel (2) and improve the efficiency of the negative reactivity introduction into the reactor core (7).

The protection device of a fast neutron nuclear reactor is shown in Fig. FIG. 1, 2 and FIG. 3 operates as follows. In the normal reactor operation mode, the cylindrical hollow space (14) of the upper vessel (1) is filled with molten cadmium, the ring-shape hollow space (15) is filled with mercury, and the lower vessel (2) is filled with an inert gas. Mercury vapour pressure in the gas cushion (16) in the upper vessel (1) with the operating heat carrier temperatures (6) below the buckling rapture disc actuation pressure (12). In case of emergency operation modes caused by rapid growth of neutron flux or loss of heat carrier flow, the heat carrier (6) in a ring-shape hollow space (22) is heated above the maximum allowable temperature and goes to the ring-shape hollow space (23) to the lateral surface of the upper vessel (1).

Mercury in the ring-shape hollow space (15) gets heated up to the temperature when the pressure of its vapours in the upper part (16) of the vessel (1) is compared with the actuation pressure of the buckling rapture disc (12) that abruptly changes its shape and brakes at the contact with the needle (26). The molten cadmium (8) is discharged though the pipe (11) under the effect of gravity to the lower vessel (2), and the inert gas from the vessel (2) goes to the upper vessel (1). When the melt with large neutron absorption cross-section goes to the vessel (2) located in the reactor core (7), chain reaction stops, and the reactor switches to the subcritical condition and the reactor protection is realized.

The practical use of the device in the new-generation fast neutron reactors provides the following benefits:

for all initial events in the reactor facility associated with rapid introduction of positive reactivity or loss of cooling (heat carrier flow rate) in the reactor core, the actuation of the reactor shut-down system that uses the proposed passive protection device, will result in the termination of the fission chain reaction in the reactor core when the heat carrier reaches the pre-set and experimentally verified temperature at the outlet from the reactor core;

the device has high-degree reliability and readiness for actuation, as it has no external power sources and information signals for the actuation, has no actively or passively moving mechanical parts that can get stuck and result to the actuation failure; the power that causes the device actuation (heat carrier temperature growth) is released in the process to be stopped by the device;

with such degree of reliability the device will get actuated in the cases when the source events are followed by multiple failures of other protective systems and devices.

The invention claimed is:

1. A device for nuclear reactor passive protection comprises:
two vessels located in a common enclosure one under another,
an upper vessel is located above a reactor core and has an internal partition wall forming a central hollow space and an annular hollow space that are interconnected with each other in their upper parts, wherein the central hollow space is partially filled with a molten cadmium and the annular hollow space is partially filled with a molten mercury;
an upper annular hollow space is formed between the upper vessel and the enclosure;
a lower vessel is located in the reactor core and is filled with an inert gas;
a lower annular hollow space is formed between the lower vessel and the enclosure, the lower annular hollow space encloses fuel elements;
the vessels are interconnected by a partitioned pipe where the partition is made in the form of a buckling rapture disc,
wherein lower annular hollow space and the upper annular hollow space are interconnected with each other and configured to allow for a heat carrier flow to cool down the fuel elements and heat the upper vessel.

2. The device according to claim 1, characterized in that the molten mercury comprises mercury isotope $^{199}$Hg, and the molten cadmium comprises cadmium isotopes $^{111}$Cd and/or $^{113}$Cd.

3. The device according to claim 1 characterized in that the internal partition wall is made of two layers separated by a gas heat-insulating gap.

4. The device according to claim 1, characterized in that a lower pipe shell is located between the lower vessel and the fuel elements for shaping the heat carrier flow to cool the fuel elements, wherein the lower pipe shell has a transverse partition wall at the top, wherein the transverse partition wall intersects a central part of the lower annular hollow space.

5. The device according to claim 1, characterized in that an upper pipe shell is located between the upper vessel and the enclosure for shaping the heat carrier flow to heat the upper vessel, wherein the upper pipe shell has a transverse partition wall at the bottom, wherein the transverse partition wall intersects a peripheral part of the lower annular hollow space.

6. The device according to claim 4, characterized in that a hollow space is formed between the lower vessel and the lower pipe shell, and a hollow space is formed between the enclosure and the upper pipe shell, wherein the hollow spaces are interconnected with each other via at least one pipe channel.

7. The device according to claim 1, characterized in that the shape and the size of the enclosure in its cross-section match the shape and the size of the reactor fuel assembly.

8. The device according to claim 7, characterized in that the enclosure has a hexagonal cross-section.

9. The device according to claim 4, characterized in that the cross-sectional shape of the lower pipe shell matches the shape of the enclosure.

10. The device according to claim 5, characterized in that the cross-sectional shape of the upper pipe shell matches the shape of the upper vessel.

11. The device according to claim 1 characterized in that pipe elements containing a neutron moderator are located between the lower vessel and the lower pipe shell.

12. The device according to claim 11, wherein the neutron moderator is beryllium oxide.

* * * * *